(12) United States Patent
Yang et al.

(10) Patent No.: US 9,055,522 B2
(45) Date of Patent: Jun. 9, 2015

(54) METHOD, DEVICE, AND SYSTEM FOR SELECTING ROUTE DISCOVERY

(75) Inventors: Hui Yang, Beijing (CN); Zhihao Xing, Beijing (CN); Houcheng Tang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 389 days.

(21) Appl. No.: 13/358,273

(22) Filed: Jan. 25, 2012

(65) Prior Publication Data

US 2012/0120961 A1   May 17, 2012

Related U.S. Application Data

(63) Continuation of application No. PCT/CN2010/075451, filed on Jul. 26, 2010.

(30) Foreign Application Priority Data

Jul. 27, 2009   (CN) .......................... 2009 1 0109248

(51) Int. Cl.
  *H04L 12/701*   (2013.01)
  *H04W 40/28*   (2009.01)
(52) U.S. Cl.
  CPC .................................... *H04W 40/28* (2013.01)
(58) Field of Classification Search
  CPC ....... H04W 40/28; H04W 84/18; H04L 45/00
  USPC .................................................. 370/400, 389
  See application file for complete search history.

(56) References Cited

U.S. PATENT DOCUMENTS

| 7,633,940 | B1 * | 12/2009 | Singh et al. ................... | 370/389 |
| 2007/0217406 | A1 * | 9/2007 | Riedel et al. .................. | 370/389 |
| 2010/0284337 | A1 * | 11/2010 | Luft et al. ..................... | 370/328 |

FOREIGN PATENT DOCUMENTS

| CM | 1878134 A | 12/2006 |
| CN | 1905546 A | 1/2007 |
| CN | 1933445 A | 3/2007 |
| WO | WO 02/084956 A1 | 10/2002 |

OTHER PUBLICATIONS

Second Chinese Office Action received in Application No. 200910109248.0, Applicant: Huawei Technologies Co., Ltd., mailed Apr. 3, 2013, 6 pages. (Partial Translation).
Jinjin, et al., "MANET Routing Research Based on Active Network," Application Research of Computers, vol. 24, No. 5, May 31, 2007, pp. 244-246. (Partial Translation).
Ergen, Sinem Coleri, "ZigBee/IEEE 802.15.4 Summary," Sep. 10, 2004, 37 pages.
First Chinese Office Action Application No. 200910109248.0 mailed Jul. 13, 2012, 14 pages. (Partial Translation).

(Continued)

*Primary Examiner* — Donald Mills
*Assistant Examiner* — Henry Baron
(74) *Attorney, Agent, or Firm* — Slater & Matsil, L.L.P.

(57) ABSTRACT

Embodiments of the present invention provide a method, device, and system for selecting route discovery, to enable flexible selection of a route discovery method. The method includes: determining the amount of data to be transmitted; selecting, according to the amount of data to be transmitted, symmetric path route discovery or asymmetric path route discovery; and transmitting a selection result to other nodes.

8 Claims, 5 Drawing Sheets

(56) References Cited

OTHER PUBLICATIONS

Chen, Jin-Lun, et al., "A path-pool routing protocol for asymmetric-link Ad Hoc networks," Journal of Circuits and Systems, vol. 9, No. 6, Beijing University of Posts and Telecommunication, Beijing, China, Dec. 2004, 5 pages.

International Search Report received in International Application No. PCT/CN2010/075451, Applicant: Huawei Technologies Co., Ltd. et al., mailed Nov. 4, 2010, 5 pages.

Written Opinion of the International Searching Authority received in International Application No. PCT/CN2010/075451, Applicant: Huawei Technologies Co., Ltd. et al., mailed Nov. 4, 2010, 5 pages.

Chinese Rejection Decision received on Application No. 200910109248.0, mailed Jul. 3, 2013, 17 pages. (Partial Translation).

\* cited by examiner

METHOD, DEVICE, AND SYSTEM FOR SELECTING ROUTE DISCOVERY

This application is a continuation of International Application No. PCT/CN2010/075451, filed on Jul. 26, 2010, which claims priority to Chinese Patent Application No. 200910109248.0, filed on Jul. 27, 2009, both of which are hereby incorporated by reference in their entireties.

TECHNICAL FIELD

The present invention relates to communications technologies, and in particular, to a method, device, and system for selecting route discovery.

BACKGROUND

The ZigBee wireless sensor network technology is a wireless communication technology suitable for short-distance transmission. ZigBee processes have advantages of low cost, low power consumption, and high reliability.

In the prior art, two route discovery methods are available for the ZigBee technology, symmetric route discovery and asymmetric route discovery.

When maintaining reverse information, the system only needs to perform route discovery once from a source node to a target node. When sending information, that is, feeding back information, from the target node to the source node, the system uses the same path. This is a symmetric route discovery method.

When no reverse information needs to be maintained, the system needs to perform route discovery twice. During signal transmission, the cost for sending signals may not be the same as the cost for feedback. In this manner, a feedback path of the least cost can be discovered, which, however, increases the complexity of route discovery.

According to the prior art, whether to maintain the reverse route depends on nwkSymLink (the local network attribute parameter). This cannot enable flexible selection of route discovery.

SUMMARY OF THE INVENTION

Embodiments of the present invention provide a method, device, and system for selecting route discovery, to enable flexible selection of a route discovery method.

An embodiment of the present invention provides a method for selecting route discovery. The amount of data to be transmitted is determined. Symmetric path route discovery or asymmetric path route discovery is selected according to the amount of data to be transmitted. A selection result is transmitted to other nodes.

Another embodiment of the present invention provides a network node. A first determining module is configured to determine the amount of data to be transmitted. A first selecting module is configured to select, according to the amount of data to be transmitted, symmetric path route discovery or asymmetric path route discovery. A first transmitting module is configured to transmit a selection result to other nodes.

Another embodiment of the present invention provides a network node. A first receiving module is configured to receive a selection result, where the selection result indicates whether symmetric path route discovery or asymmetric path route discovery is selected. A second processing module is configured to determine, according to the selection result, whether to save a reverse route to a source node, or to modify, according to a route discovery flag, a local network attribute parameter nwkSymLink, and to determine, according to the modified parameter nkwSymLink, whether to save the reverse route to the source node.

An embodiment of the present invention provides a system for selecting route discovery. A source node is configured to determine the amount of data to be transmitted, to select symmetric path route discovery or asymmetric path route discovery according to the amount of data to be transmitted, and to transmit a selection result to other nodes. An intermediate node is configured to receive the selection result. The selection result indicates whether symmetric path route discovery or asymmetric path route discovery is selected. The intermediate node is also configured to determine, according to a route discovery flag in a router solicitation command, whether to save a reverse route to the source node; or to modify, according to the route discovery flag, a local network attribute parameter nwkSymLink, and to determine, according to the modified parameter nkwSymLink, whether to save the reverse route to the source node.

Embodiments of the present invention provide a method, device, and system for selecting route discovery.

A route discovery policy can be determined according to the amount of data to be transmitted, which reduces signaling interaction, and solves the problem that the route discovery method cannot be flexibly selected.

DETAILED DESCRIPTION OF ILLUSTRATIVE EMBODIMENTS

Embodiments of the present invention provide a method, device, and system for selecting route discovery. The following describes the technical solutions disclosed in embodiments of the present invention in detail.

Figure 1:
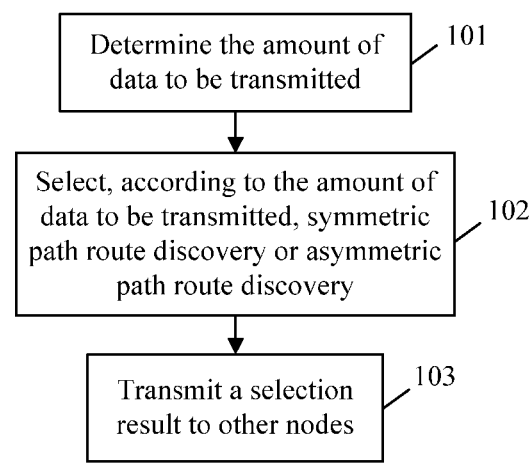
FIG. 1 is a schematic diagram of selecting route discovery according to an embodiment of the present invention.

FIG. 1 is a schematic diagram of selecting route discovery according to an embodiment of the present invention. The embodiment includes the following steps:

Step 101: Determine the amount of data to be transmitted.

Step 102: Select, according to the amount of data to be transmitted, symmetric path route discovery or asymmetric path route discovery.

Step 103: Transmit a selection result to other nodes.

The embodiment is applicable before data is transmitted from a source node to a target node. In network transmission, a path with a minimum cost needs to be selected for data transmission. The process of selecting a path is called route discovery. Symmetric route discovery means that the same path is selected for an uplink and in a downlink. To be specific, after route discovery is performed on the downlink, the uplink does not need an independent route discovery process, but uses the same path as the downlink. This reduces the cost of route discovery. However, network transmission is not always regular. An optimal route in downlink transmission may not be optimal in uplink transmission. Asymmetric route discovery means that route discovery is performed for the uplink and downlink each. This improves the transmission efficiency but in comparison with symmetric route discovery, requires twice the power consumption, time, and calculation workload of each node, and so on.

Therefore, if symmetric path route discovery or asymmetric path route discover is flexibly selected according to the amount of data to be transmitted, the data transmission efficiency can be improved and network resources are saved. Specifically, the selection of route discovery may be implemented in multiple ways. For example, a threshold is set; if the amount of data to be transmitted is greater than the threshold, the amount of data to be transmitted is large and asymmetric route discovery is more efficient because more resources may be saved during the future data transmission although an additional route discovery process is required; if the amount of data to be transmitted is smaller than the threshold, the amount of data to be transmitted is small and symmetric route discovery is more efficient because selecting an asymmetric route requires route discovery twice which causes a lower cost than the resources to be saved in the future. Alternatively, three thresholds may be set. If the amount of data to be transmitted is greater than an upper threshold, asymmetric route discovery is more efficient; if the amount is smaller than a lower threshold, symmetric route discovery is more efficient; if the amount is between the upper threshold and the lower threshold, any routing policy can be selected randomly or a routing policy can be selected according to the local network attribute parameter nwkSymLink. The methods for setting the threshold are not limited to the two examples.

Finally, the selection result is transmitted to other nodes. After receiving the selection result, the other nodes may change the route discovery policy by modifying the local network attribute parameter nwkSymLink.

In the embodiment of the present invention, a route discovery method is flexibly selected according to the amount of data to be transmitted, which improves the data transmission efficiency, saves the network resources, and shortens the delay.

Figure 2:
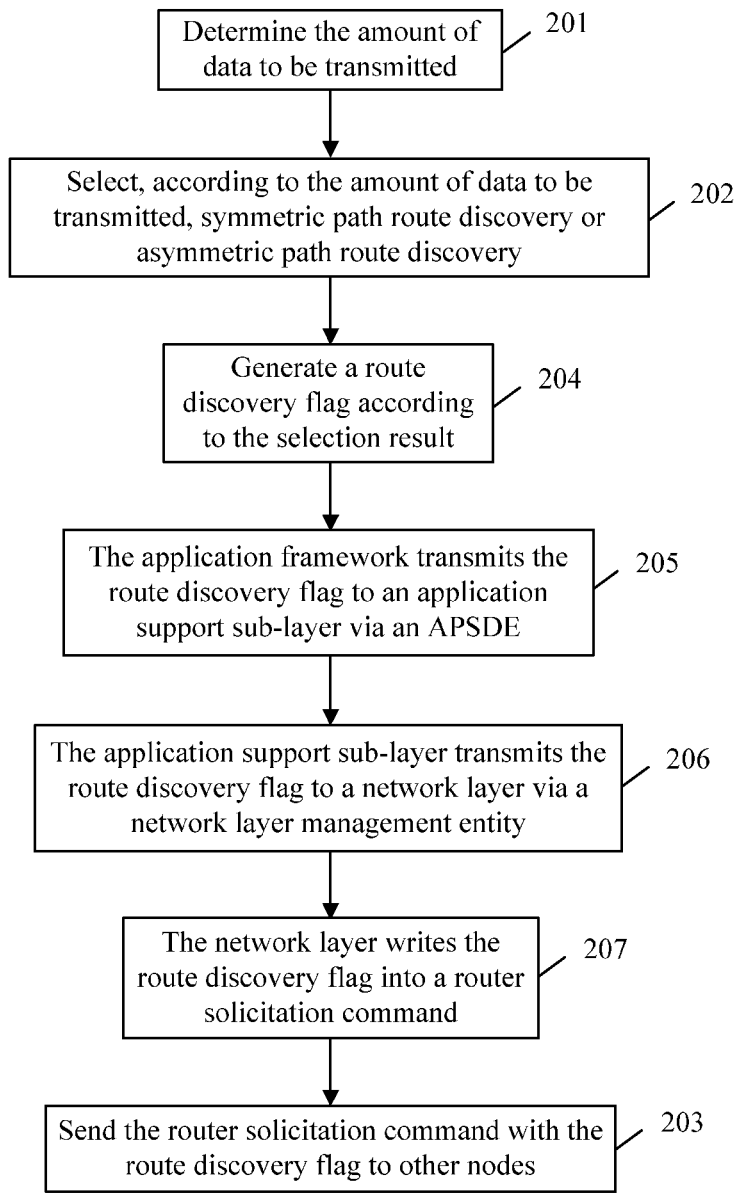
FIG. 2 is a schematic diagram of selecting route discovery according to an embodiment of the present invention.

FIG. 2 is a schematic diagram of selecting route discovery according to an embodiment of the present invention. The embodiment includes the following steps.

Step 201: Determine the amount of data to be transmitted.

Step 202: Select, according to the amount of data to be transmitted, symmetric path route discovery or asymmetric path route discovery.

Step 203: Send a router solicitation command into which a route discovery flag is written to other nodes, where the route discovery flag is used to indicate a routing result of step 202.

Before step 203, the procedure may further include step 204, which is to generate a route discovery flag used to indicate the selection result in step 202 according to the selection result.

Specifically, an application framework in the source node generates the route discovery flag. For ease of description, the following uses the application framework as an example.

Step 205: The application framework transmits the route discovery flag to an application support sub-layer through an APSDE (Application Support Sub-layer Data Entity, APSDE). The route discovery flag may be specifically transmitted by using a data request primitive.

Step 206: The application support sub-layer transmits the route discovery flag to a network layer through a network layer management entity, where the route discovery flag is specifically transmitted by using a discovery request primitive.

Step 207: The network layer writes the route discovery flag into a router solicitation command.

The embodiment differs from the embodiment illustrated in FIG. 1 in that, after route discovery is selected, the application layer generates the route discovery flag indicating the selection result and transmits the flag to the network layer. This provides a feasible channel for transmission of the selection result between layers.

The process of route discovery flag transmission is specifically as follows. The application framework writes the route discovery flag into the data request primitive of the APSDE and transmits the data request primitive to the application support sub-layer. The application support sub-layer then writes the route discovery flag into a discovery request primitive of the network layer management entity and transmits the discovery request primitive to the network layer. Finally, the network layer writes the route discovery flag into the router solicitation command and sends the command.

The intermediate node that receives the router solicitation command determines, according to the route discovery flag carried in the command, whether to save the reverse route to the source node; or as described the embodiment illustrated in FIG. 1, the intermediate node changes the route discovery policy by modifying the local network attribute parameter nwkSymLink. The preceding transmission process is for illustration only and the transmission of the route discovery flag is not limited to the two methods.

In an embodiment of the present invention, a route discovery policy is flexibly selected according to the amount of data to be transmitted, which saves the network resources, and shortens the delay. In addition, the original interfaces are used to transmit the route discovery flag, which is a solution to transmitting the selection result to the application layer.

Figure 3:
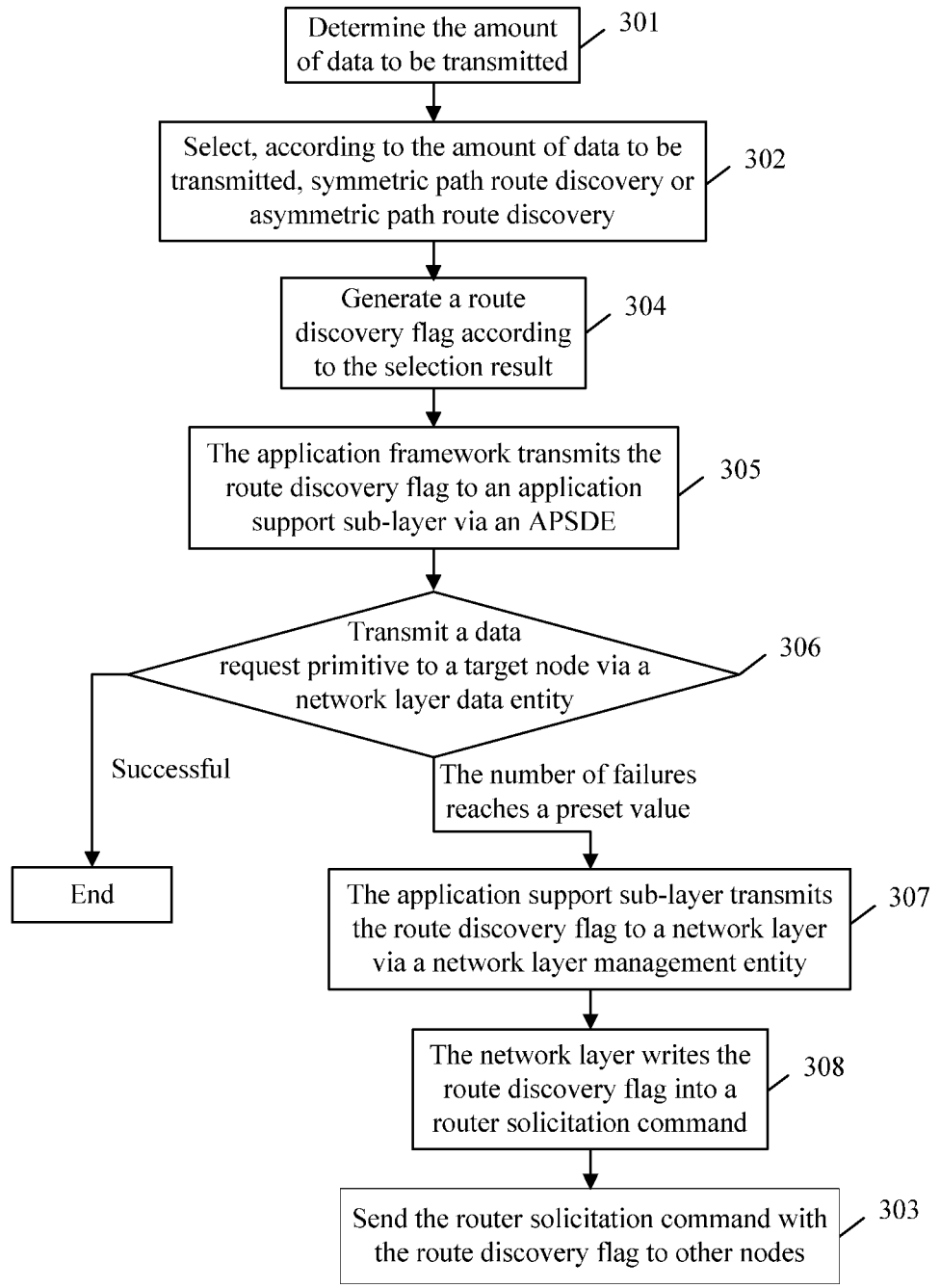
FIG. 3 is a schematic diagram of selecting route discovery according to an embodiment of the present invention.

FIG. 3 is a schematic diagram of selecting route discovery according to an embodiment of the present invention. The embodiment includes the following steps.

Step 301: Determine the amount of data to be transmitted.

Step 302: Select, according to the amount of data to be transmitted, symmetric path route discovery or asymmetric path route discovery.

Step 303: Send a router solicitation command with a route discovery flag to other nodes.

Other nodes may select a route discovery way according to the route discovery flag, and establish a new route.

Before step 303, the procedure may further include, step 304, in which an application framework generates a route discovery flag according to a selection result.

Step 305: The application framework transmits the route discovery flag to an application support sub-layer through an APSDE (Application Support Sub-layer Data Entity, APSDE). The route discovery flag may be specifically transmitted by using a data request primitive.

Step 306: The application support sub-layer transmits a data request primitive to a target node through a network layer data entity, where the data request primitive may carry a route discovery flag or may not carry a route discovery flag. Steps 307 and 308 are performed to establish a new route if the number of failures of transmitting the data request primitive reaches a preset value; the procedure ends if the data request primitive is transmitted successfully. Step 307: The application support sub-layer transmits the route discovery flag to a network layer through a network layer management entity by using a discover request primitive of the network layer management entity.

Step 308: The network layer writes the route discovery flag into a router solicitation command.

The embodiment is also applicable before data is transmitted from a source node to a target node. The embodiment differs from the embodiment shown in FIG. 2 in that it is determined whether a route has been established before the establishment of a new route is initiated. If a route has been established and may be used to transmit data, the data may be directly transmitted to other nodes and it is unnecessary to transmit a route discovery flag to other nodes. If an established route is invalid or a route has not been established, the transmission fails. After the number of failures reaches a specific value, for example, three times, the route flag is transmitted to other nodes to initiate the establishment of a new route.

In the embodiment of the present invention, a route discovery policy is determined according to the amount of data to be transmitted and a route discovery method is flexibly selected. The original interfaces are used to transmit the route discovery flag indicating the selection result only when a new connection needs to be established because no connection is available or an established connection is invalid. This further saves the network resources and shortens the delay.

Figure 4:
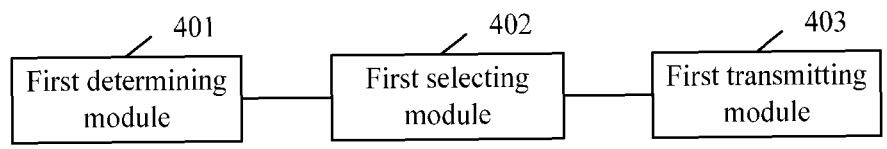
FIG. 4 is a schematic structural diagram of a network node according to an embodiment of the present invention.

FIG. 4 is a schematic structural diagram of a network node according to an embodiment of the present invention. The embodiment includes a first determining module 401, which is configured to determine the amount of data to be transmitted. A first selecting module 402 is configured to select, according to the amount of data to be transmitted, symmetric path route discovery or asymmetric path route discovery. A transmitting module 403 is configured to transmit a selection result of the first selecting module to other nodes.

The network node provided in this embodiment is configured to implement the method according to the embodiment illustrated in FIG. 1.

Figure 5:
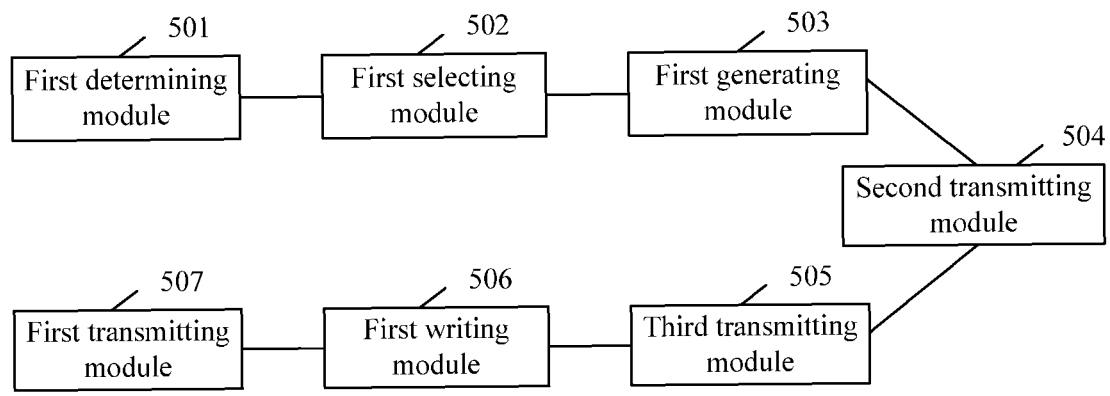
FIG. 5 is a schematic structural diagram of a network node according to an embodiment of the present invention.

FIG. 5 is a schematic structural diagram of a network node according to an embodiment of the present invention. The embodiment includes a first determining module 501, which is configured to determine the amount of data to be transmitted. A first selecting module 502 is configured to select, according to the amount of data to be transmitted, symmetric path route discovery or asymmetric path route discovery. A first generating module 503 is configured to generate a route discovery flag indicating a selection result of the first selecting module. A second transmitting module 504 is configured to transmit the route discovery flag generated by the first generating module to an application support sub-layer through an APSDE. A third transmitting module 505 is arranged at the application support sub-layer and is configured to transmit the route discovery flag generated by the first generating module to a network layer through a network layer management entity. A first writing module 506 is arranged at the network layer and configured to write the route discovery flag generated by the first generating module into a router solicitation command. A first transmitting module 507 is configured to transmit the router solicitation command into which the first writing module writes the route discovery flag to other nodes.

The network node provided in this embodiment is configured to implement the method according to the embodiment illustrated in FIG. 2.

Figure 6:
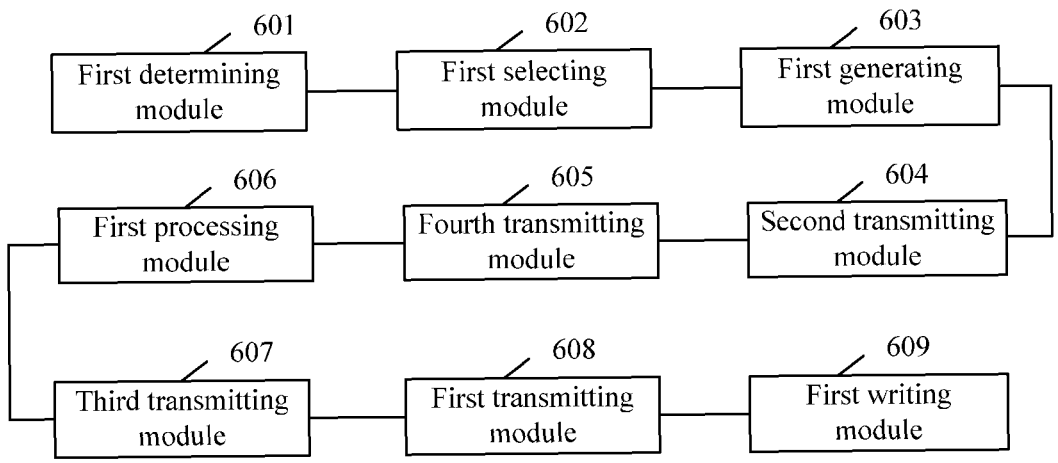
FIG. 6 is a schematic structural diagram of a network node according to an embodiment of the present invention.

FIG. 6 is a schematic structural diagram of a network node according to an embodiment of the present invention. This embodiment includes a first determining module 601, which is configured to determine the amount of data to be transmitted. A first selecting module 602 is configured to select, according to the amount of data to be transmitted, symmetric path route discovery or asymmetric path route discovery. A first generating module 603 is configured to generate a route discovery flag indicating a selection result of the first selecting module. A second transmitting module 604 is configured to transmit the route discovery flag to an application support sub-layer through an APSDE. A fourth transmitting module 605 is arranged at the application support sub-layer and is configured to transmit a data request primitive to a target node through a network layer data entity. A first processing module 606 is configured to, when the number of transmission failures of the fourth transmitting module reaches a preset value, skip to the third transmitting module 607 to perform the step of transmitting the route discovery flag to a network layer by using a discovery request primitive of a network layer management entity and follow-up steps to establish a new route; and The first processing module 606 is also configured to end the procedure after the fourth transmitting module transmits the data request primitive successfully. A third transmitting module 607 is arranged at the application support sub-layer and is configured to transmit the route discovery flag to the network layer through the network layer management entity. A first writing module 608 is arranged at the network layer and is configured to write the route discovery flag into a router solicitation command. A first transmitting module 609 is configured to transmit the router solicitation command into which the first writing module writes the route discovery flag to other nodes.

The network node provided in this embodiment is configured to implement the method according to the embodiment illustrated in FIG. 3.

Figure 7:
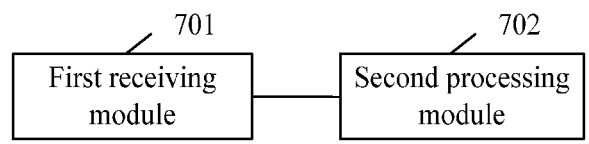
FIG. 7 is a schematic structural diagram of a network node according to an embodiment of the present invention.

FIG. 7 is a schematic structural diagram of a network node according to an embodiment of the present invention. This embodiment includes a first receiving module 701, which is configured to receive a selection result, where the selection result indicates whether symmetric path route discovery or asymmetric path route discovery is selected. A second processing module 702 is configured to determine, according to the selection result received by the first receiving module, whether to save a reverse route to a source node, or to modify, according to the selection result, a local network attribute parameter nwkSymLink, and determine, according to the modified parameter nkwSymLink, whether to save the reverse route to the source node.

After receiving the selection result transmitted by the network node illustrated in FIG. 4, FIG. 5, and FIG. 6, the network node provided in this embodiment directly implements symmetric route discovery or asymmetric route discovery according to the selection result. If the reverse route to the source node is saved during the implementation of symmetric path route discovery, the reverse route to the source node is not saved during the implementation of asymmetric path route discovery. The network node provided in this embodiment is configured to implement the methods according to the embodiments illustrated in FIG. 1, FIG. 2, and FIG. 3.

Figure 8:
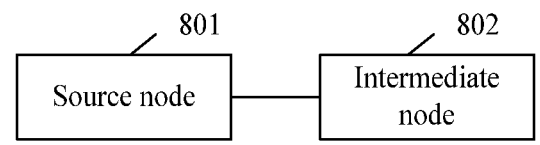
FIG. 8 is a schematic structural diagram of a system for selecting route discovery according to an embodiment of the present invention.

FIG. 8 is a schematic structural diagram of a system for selecting route discovery according to an embodiment of the present invention. This embodiment includes a source node 801, which is configured to determine the amount of data to be transmitted, select symmetric path route discovery or asymmetric path route discovery according to the amount of data to be transmitted, and transmit a selection result to other nodes. An intermediate node 802 is configured to receive the selection result, where the selection result indicates whether symmetric path route discovery or asymmetric path route discovery is selected and to determine, according to the selection result received by the first receiving module, whether to save a reverse route to a source node, or to modify, according to the selection result, a local network attribute parameter nwkSymLink, and to determine, according to the modified parameter nkwSymLink, whether to save the reverse route to the source node.

The network node provided in this embodiment is configured to implement the methods according to the embodiments illustrated in FIG. 1, FIG. 2, and FIG. 3.

According to the above description of the embodiments of the present invention, those skilled in the art can easily understand that the embodiments of the present invention can be implemented using hardware, or using software in combination with a versatile hardware platform. Based on such understandings, the technical solution of the present invention may be embodied in the form of a software product. The software product may be stored in a non-volatile storage medium, such as a CD-ROM, a USB flash disk, or a mobile hard disk. The software product includes multiple instructions that enable a computer device (such as a personal computer, a server, or a network device) to execute the methods provided in the embodiments of the present invention.

Those skilled in the art may understand that the accompanying drawings are exemplary ones for illustrating the embodiments, and that the involved modules and procedures are not definitely required for the implementation of the present invention.

Those skilled in the art may understand that the modules in the devices provided in embodiments may be arranged in the devices in a distributed manner according to the description of the embodiments, or may be arranged in one or multiple devices which are different from those described in the embodiments of the present invention. The modules according to above embodiments may be combined into one module, or split into multiple submodules.

The sequence numbers of the preceding embodiments of the present invention are only for ease of description, and do not denote the preference of the embodiments.

Detailed above are merely exemplary embodiments of the present invention, but the present invention is not limited thereto. Modifications and variations readily apparent to those skilled in the art shall fall within the protection scope of the present invention.

What claimed is:

1. A method for selecting route discovery, the method comprising:
   determining an amount of data to be transmitted over a channel;
   selecting, according to the amount of data to be transmitted, symmetric path route discovery or asymmetric path route discovery for the channel prior to performing discovery of a transmission route for the channel, wherein asymmetric path route discovery is selected when the amount of data to be transmitted is greater than a threshold, and wherein symmetric path route discovery is selected when the amount of data to be transmitted is equal to, or smaller than, the threshold; and
   transmitting a selection result of the selecting to other nodes, wherein the transmitting initiates the performing the discovery of the transmission route for the channel;
   wherein the symmetric path route discovery requires that a same path be selected for an uplink and a downlink of the transmission route; and
   wherein the asymmetric path route discovery permits different paths to be selected for the uplink and the downlink of the transmission route.

2. The method according to claim 1, wherein after transmitting the selection result to the other nodes, the method further comprises:
   determining, by a node receiving the selection result, according to the selection result, whether to save a reverse route to a source node.

3. The method according to claim 1, wherein before transmitting the selection result to the other nodes, the method further comprises:
   generating a route discovery flag indicating the selection result;
   transmitting the route discovery flag to an application support sub-layer through an application support sub-layer data entity (APSDE);
   transmitting, by the application support sub-layer, the route discovery flag to a network layer through a network layer management entity; and
   writing, by the network layer, the route discovery flag into a router solicitation command;
   wherein transmitting the selection result to the other nodes comprises sending the router solicitation command into which the route discovery flag is written to the other nodes.

4. The method according to claim 3, wherein before transmitting the route discovery flag, the method further comprises:
   transmitting, by the application support sub-layer, a data request primitive to a target node through a network layer data entity, and when a number of failures of transmitting the data request primitive reaches a preset value, performing the step of transmitting the route discovery flag to the network layer by using a discovery request primitive of the network layer management entity and follow-up steps to establish a new route; and
   ending the transmitting of the data request primitive when the data request primitive is transmitted successfully.

5. A network node that comprises a computer device that executes instructions, the network node comprising:
   a first determining module, configured to determine an amount of data to be transmitted over a channel;
   a first selecting module, configured to select, according to the amount of data to be transmitted, symmetric path route discovery or asymmetric path route discovery for the channel as part of discovery of a transmission route for the channel, wherein asymmetric path route discovery is selected when the amount of data to be transmitted is greater than a threshold, and wherein symmetric path route discovery is selected when the amount of data to be transmitted is equal to, or smaller than, the threshold; and
   a first transmitting module, configured to transmit a selection result of the first selecting module to other nodes to perform additional discovery of the transmission route for the channel;
   wherein the symmetric path route discovery requires that a same path be selected for an uplink and a downlink of the transmission route; and
   wherein the asymmetric path route discovery permits a different path to be selected for the uplink and the downlink of the transmission route.

6. The network node according to claim 5, further comprising:
- a first generating module, configured to generate a route discovery flag indicating the selection result of the first selecting module;
- a second transmitting module, configured to transmit the route discovery flag generated by the first generating module to an application support sub-layer through an application support sub-layer data entity (APSDE);
- a third transmitting module, arranged at the application support sub-layer and configured to transmit the route discovery flag generated by the first generating module to a network layer through a network layer management entity; and
- a first writing module, arranged at the network layer and configured to write the route discovery flag generated by the first generating module into a router solicitation command;
- wherein the first transmitting module is further configured to transmit the router solicitation command into which the first writing module writes the route discovery flag to the other nodes.

7. The network node according to claim 6, further comprising:
- a fourth transmitting module, arranged at the application support sub-layer and configured to transmit a data request primitive to a target node through a network layer data entity; and
- a first processing module, configured to skip to the third transmitting module to perform the step of transmitting the route discovery flag to the network layer through the network layer management entity and follow-up steps to establish a new route when a number of transmission failures of the fourth transmitting module reaches a preset value, and to end transmission of the data request primitive after the fourth transmitting module transmits the data request primitive successfully.

8. A network node that comprises a computer device that executes instructions, the network node, comprising:
- a receiving module, configured to receive a first selection result as part of discovery of a first route for the first channel, wherein the first selection result indicates whether symmetric path route discovery or asymmetric path route discovery is selected for a first channel;
- a processing module, configured to determine, according to the first selection result received by the receiving module, whether to save a reverse route to a source node, or to modify, according to the first selection result, a local network attribute parameter nwkSymLink, and determine, according to a modified parameter nkwSymLink, whether to save the reverse route to the source node;
- a determining module, configured to determine an amount of data to be transmitted over a second channel prior to discovering a second route for the second channel;
- a selecting module, configured to select, according to the amount of data to be transmitted over the second channel, symmetric path route discovery or asymmetric path route discovery for the second channel, wherein asymmetric path route discovery is selected when the amount of data to be transmitted is greater than a threshold, and wherein symmetric path route discovery is selected when the amount of data to be transmitted is equal to, or smaller than, the threshold; and
- a transmitting module, configured to transmit a second selection result of the selecting module to other nodes as part of the discovery of the second route for the second channel;
- wherein the symmetric path route discovery requires that a same path be selected for an uplink and a downlink of the transmission route; and
- wherein the asymmetric path route discovery permits a different path to be selected for the uplink and the downlink of the transmission route.

* * * * *